United States Patent
Park

(10) Patent No.: US 8,068,277 B2
(45) Date of Patent: Nov. 29, 2011

(54) REFLECTIVE TYPE SCREEN USING A SPACER LAYER

(75) Inventor: Sang Tae Park, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 12/626,570

(22) Filed: Nov. 25, 2009

(65) Prior Publication Data

US 2010/0165458 A1    Jul. 1, 2010

Related U.S. Application Data

(60) Provisional application No. 61/118,418, filed on Nov. 26, 2008.

(51) Int. Cl.
*G03B 21/60* (2006.01)
(52) U.S. Cl. .................................... 359/452; 359/449
(58) Field of Classification Search .................. 359/449, 359/459, 452
See application file for complete search history.

(56) References Cited

U.S. PATENT DOCUMENTS

| | | | | |
|---|---|---|---|---|
| 3,893,748 A * | 7/1975 | De Palma et al. | ............ | 359/455 |
| 5,668,662 A * | 9/1997 | Magocs et al. | ............ | 359/452 |
| 6,842,282 B2 * | 1/2005 | Kuroda et al. | ............ | 359/449 |
| 7,349,154 B2 * | 3/2008 | Aiura et al. | ............ | 359/449 |
| 7,796,331 B2 * | 9/2010 | Mizushima et al. | ......... | 359/449 |
| 7,826,135 B2 * | 11/2010 | Destain et al. | ............ | 359/449 |
| 7,911,692 B2 * | 3/2011 | Okamoto | ............ | 359/449 |
| 2005/0007663 A1 * | 1/2005 | Chubachi et al. | ............ | 359/449 |
| 2010/0079861 A1 * | 4/2010 | Powell | ............ | 359/449 |
| 2010/0103513 A1 * | 4/2010 | Chuang et al. | ............ | 359/449 |

* cited by examiner

*Primary Examiner* — Christopher Mahoney
(74) *Attorney, Agent, or Firm* — Birch, Stewart, Kolasch & Birch, LLP

(57) ABSTRACT

A reflective type screen using a spacer layer and that includes a light blocking layer blocking an incident light, a reflective layer formed on the light blocking layer to reflect the incident light, a diffusion layer formed on the reflective layer to diffuse the incident light, and at least one spacer layer formed between the reflective layer and the diffusion layer to have a refractive index differing from that of an adjacent layer to refract the incident light.

19 Claims, 3 Drawing Sheets

FIG. 3

| Diffusion layer | ~130 |
| 1st Spacer layer | ~120a |
| 2nd Spacer layer | ~120b |
| Reflective layer | ~110 |
| Light blocking layer | ~100 |

FIG. 4

| 1st Diffusion layer | ~130a |
| 1st Spacer layer | ~120a |
| 2nd Spacer layer | ~120b |
| 2nd Diffusion layer | ~130b |
| Reflective layer | ~110 |
| Light blocking layer | ~100 |

FIG. 5

| | |
|---|---|
| 1st Diffusion layer | 130a |
| 1st Spacer layer | 120a |
| 2nd Diffusion layer | 130b |
| 2nd Spacer layer | 120b |
| Reflective layer | 110 |
| Light blocking layer | 100 |

REFLECTIVE TYPE SCREEN USING A SPACER LAYER

CROSS REFERENCE TO RELATED APPLICATIONS

This application claims the benefit of the U.S. Provisional Application No. 61/118,418, filed on Nov. 26, 2008, which is hereby incorporated by reference as if fully set forth herein.

BACKGROUND OF THE INVENTION

1. Field of the Invention

The present invention relates to a reflective type screen, and more particularly, to a reflective type screen using a spacer layer.

2. Discussion of the Related Art

Recently, entering upon the $21^{st}$ century for the era of advanced information, research and development of new displays become more important. And, the request and demand for a large-scale display is rapidly rising.

Yet, the drop in prices of a large-scale display may not meet the level wanted by consumers.

A 42-inch display is approaching it popularization and a fall in prices of a 50-inch display is increasing. Yet, a flat panel display over 70 inches suitable for a home theater implementation is still far away from popularization due to its price too high for a general consumer to purchase.

On the contrary, a projection TV having good performance in aspect of price per screen size is more disadvantageous in volume and image quality than a flat panel display and is not popular anymore.

Currently, a front projector having its own market for a mania group just can be installed by hanging its screen on a wall and can solve the problem of the disadvantages of the projection TV in aspect of volume.

Although installation of the front projector is not easy and a projection distance has to be secured, a development of a product having a considerably short projection distance is ongoing. Moreover, a consumer-specific building design is available. Hence, the problem caused by transmission and power lines can be solved by built-in connection.

And, this problem can be also solved by the development of the wireless transmission technology.

Even if the above mentioned problems are solved, the projector is still inferior to the flat panel display in aspect of image quality. Considering the research and development of the projector are set toward LED and laser systems, brightness of the projector is much poorer than that of the conventional lamp system. Thus, the problems of the image quality and brightness become more important issues.

Accordingly, the demand for a solution of a contrast ratio problem affecting the brightness and image quality, and more particularly, the image quality is rising.

However, it seems that the enhancement of the project is unable to solve the above mentioned problems. So, many efforts are made to discover a way for the solution from a screen that is a final interface contacting with a user.

Recently, since many attempts to increase the brightness and contrast ratio of the screen have been made in various ways, various kinds of surface treatments and stacked layer structures are developed to meet a prescribed level. But, they still fail to reach a level for consumer's satisfaction. Specifically, many parts still need to be enhanced to cope with an LED or Laser projector.

In order to improve a brightness, image quality and viewing angle of a screen, various kinds of optical processing are performed on the screen in general. Specifically, it is attempted to obtain specific performance in a manner of controlling diffusion, reflection and absorption of light on a screen surface by various structures and methods.

SUMMARY OF THE INVENTION

Accordingly, the present invention is directed to a reflective type screen that substantially obviates one or more problems due to limitations and disadvantages of the related art.

An object of the present invention is to provide a reflective type screen, by which a brightness, image quality and viewing angle can be enhanced in a manner of increasing diffusion of light using at least one spacer layer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a reflective type screen according to the present invention includes a light blocking layer blocking an incident light, a reflective layer formed on the light blocking layer to reflect the incident light, a diffusion layer formed on the reflective layer to diffuse the incident light, and at least one spacer layer formed between the reflective layer and the diffusion layer, the at least one spacer layer configured to have a refractive index differing from that of an adjacent layer to refract the incident light.

Preferably, a refractive index difference between the at least one spacer layer and the adjacent layer is 0.01~1.

Preferably, the refractive index of the at least one spacer layer is greater than that of the adjacent layer.

Preferably, the at least one spacer layer includes either an air or a transparent film.

More preferably, the transparent film includes at least one selected from the group consisting of a scattering particle for scattering the incident light and a coloring agent for absorbing the incident light in part.

More preferably, a multitude of projections are formed on either a top or bottom surface of the transparent film.

In another aspect of the present invention, a reflective type screen includes a light blocking layer blocking an incident light, a reflective layer formed on the light blocking layer to reflect the incident light, first and second diffusion layers formed on the reflective layer to diffuse the incident light, and at least one spacer layer formed between the first and second diffusion layers to have a refractive index differing from that of each of the first and second diffusion layers to refract the incident light.

Preferably, a refractive index difference between the spacer layer and the first diffusion layer or between the spacer layer and the second diffusion layer is 0.01~1 and a refractive index of the spacer layer is greater than that of each of the first and second diffusion layers.

Preferably, the spacer layer includes either a single layer formed of an air or a transparent film or a multi-layer including a first layer formed of the air and a second layer formed of the transparent film.

In another aspect of the present invention, a reflective type screen includes a light blocking layer blocking an incident light, a reflective layer formed on the light blocking layer to reflect the incident light, a diffusion layer formed on the reflective layer to diffuse the incident light, and first and second spacer layers formed between the reflective layer and the diffusion layer, each having a refractive index differing from that of an adjacent layer to refract the incident light. In this case, the first spacer layer is formed of an air and the second spacer layer is formed of a transparent film.

In a further aspect of the present invention, a reflective type screen includes a light blocking layer blocking an incident light, a reflective layer formed on the light blocking layer to reflect the incident light, a second film formed on the reflective layer, the second film including a second diffusion layer diffusing the incident light and a second spacer layer having a refractive index differing from that of the second diffusion layer to refract the incident light, and a first film formed on the second film, the first film including a first diffusion layer diffusing the incident light and a first spacer layer having a refractive index differing from that of the first diffusion layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a cross-sectional diagram of a reflective type screen according to a third embodiment of the present invention;

FIG. 4 is a cross-sectional diagram of a reflective type screen according to a fourth embodiment of the present invention; and FIG. 5 is a cross-sectional diagram of a reflective type screen according to a fifth embodiment of the present invention.

DETAILED DESCRIPTION OF THE INVENTION

Figure 1A:
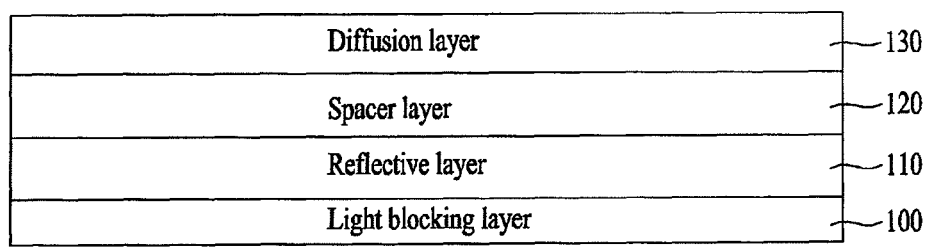
FIGS. 1A and 1B are cross-sectional diagrams of a reflective type screen according to a first embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

With various modifications and alterations of the present invention, specific embodiments of the present invention are exemplarily shown in the drawings and will be explained in detail in the following description. It is not intended to limit the present invention in a specific form disclosed in the specification. Instead, the present invention covers the modifications and variations of this invention provided they come within the scope of the appended claims and their equivalents.

Figure 1B:
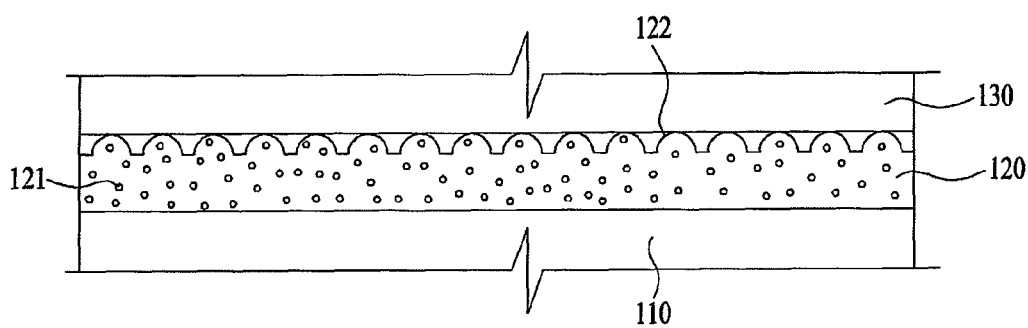

FIGS. 1A and 1B are cross-sectional diagrams of a reflective type screen according to a first embodiment of the present invention.

Referring to FIG. 1A, a reflective type screen according to a first embodiment of the present invention can mainly include a light block layer 100, a reflective layer 110, a diffusion layer 120 and a spacer layer 130.

In this case, the light blocking layer plays a role in blocking an incident light or can play a role in absorbing the incident light.

The light blocking layer 100 can play a role as a deposition mother material of the reflective layer 110 and can be formed of one of polyethylene (PE), polyethylene terephthalate (PET), polypropylene (PP), polyvinylchloride (PVC), etc.

In order to increase a contrast ratio of image by absorbing an external light, the light blocking layer 100 can be formed of a non-transparent plastic film, plastic sheet or glass of black, gray or one of other dark color series.

In this case, if the light blocking layer 100 is formed of plastic, it is able to use acryl resin or polycarbonate resin. In order to implement a dark color, the light blocking layer 100 can be formed in a manner of spreading a dark pigment into plastic or tinting a dark pigment on plastic.

The reflective layer 110 is formed on the light blocking layer 100 and plays a role in reflecting an incident light.

The reflective layer 110 can be formed of one of such a metal sheet having a high glossy reflective property as Al, Ag, Fe and the like, a metal coated reflective film including a plastic film and such a metal coated on the plastic film as Au, Ag, Al, stainless steel and the like, a metal coated reflective glass including a glass and a metal coated on the glass, a mirror glass and the like.

In this case, a light reflexibility of the light reflective layer ranges between 10 and 95% and can be determined according to a thickness of the spacer layer 120 or a light absorptivity of the spacer layer 120.

For instance, if the thickness of the spacer layer 120 is 0.01~149 μm or a light absorptive coloring agent is not contained in the spacer layer 120, the light reflexibility of the reflective layer 110 ranges between 10~30%. For another instance, if the thickness of the spacer layer 120 is 150 μm~1 mm or a light absorptive coloring agent is contained in the spacer layer 120, the light reflexibility of the reflective layer 110 can range between 31~95%.

The spacer layer 120 can be provided as a single layer or a multi-layer between the reflective layer 110 and the diffusion layer 130. And, the spacer layer 120 can have a refractive index different from that of an adjacent layer to enable an incident light to be refracted.

In particular, the spacer layer 120 can have a refractive index different from that of the reflective layer 110 or the diffusion layer 130 adjacent to the spacer layer 120.

Preferably, a refractive index difference between the spacer layer 120 and the reflective layer 110 or the diffusion layer 130 adjacent to the spacer layer 120 is set to 0.01~1.

The reason why the refractive index difference between the spacer layer 120 and the adjacent layer is set to 0.01~1 is because a brightness, image quality and viewing angle can be enhanced by further increasing the diffusion of the incident light.

If the refractive index difference between the spacer layer 120 and the adjacent layer is set to a value equal to or smaller than 0.01, it is unable to attain the object of the present invention. And, it is also difficult to fabricate a reflective type screen having a refractive index difference set to a value equal to or greater than 1.

Preferably, the refractive index of the spacer layer 120 is set greater than that of the reflective layer 110 or the diffusion layer 130 adjacent to the spacer layer 120.

And, the spacer layer 120 can include air or a transparent film.

In this case, the transparent film can include one of polyethylene (PE), polyethylene terephthalate (PET), polypropylene (PP), polyvinylchloride (PVC), ethylene vinyl alcohol (EVA), urethane resin, polycarbonate (PC), polymethylmethacrylate (PMMA), etc.

The transparent film can include at least one of a scattering particle 121 for scattering an incident light and a coloring agent for absorbing the incident light in part, as shown in FIG. 1B.

In this case, a diameter of the scattering particle is 1~200 µm and preferably has 1~50 parts by weight in a total weight 100 of the transparent film.

If the diameter of the scattering particle is equal to or grater than 200 µm, a viewing angle is degraded. If the diameter of the scattering particle is equal to or smaller than 1 µm, a luminance may be degraded. If a content of scattering particles is smaller than about 1 part by weight or equal to or greater than 50 parts by weight, the luminance and viewing angle can be degraded.

The scattering particle is formed of one of such an inorganic material as silica, zirconia, glass and the like and such an organic material as acryl resin, urethane resin, vinyl chloride resin and the like or can be formed of a mixture thereof.

The coloring agent includes black dyes or pigments. The coloring agent preferably has 1~10 parts by weight in total weight of 100 parts by weight of the transparent film.

The coloring agent reduces a reflective quantity of an external light by absorbing light, thereby improving a contrast of image. Therefore, the coloring agent can use such black dyes or pigments as carbon black.

If a content of the coloring agent is equal to or smaller than 1 part by weight, the contrast can be degraded. If a content of the coloring agent is greater than 10 parts by weight, the luminance can be degraded.

Meanwhile, the spacer layer 120 can be formed 0.01 µm~1 mm thick. In case that the spacer layer 120 includes the transparent film, it is preferably formed 0.01 µm~1 mm thick. In case that the spacer layer 120 is formed of air, it can be formed 0.001 µm~1 mm thick.

In case that the thickness of the spacer layer 120 is equal to smaller than 0.001 µm, the luminance and viewing angle are not enhanced. In case that the thickness of the spacer layer 120 is equal to or greater than 1 mm, a manufacturing cost is raised and the corresponding fabrication may become difficult.

In order to improve a viewing angle by increasing diffusion of light, a multitude of projections 122 can be further formed on either a top or bottom surface of the spacer layer 120 including the transparent film, as shown in FIG. 1B.

In this case, a height of each of the projections is preferably set to 70 µm~0.5 mm. A gap between the projections can be preferably set to 0.001~0.1 mm.

If the projection's height or gap of the spacer layer 120 deviates from the above range, the diffusion of light is degraded. Hence, the viewing angle may not be enhanced.

And, the gap between the projections can be filled with air.

Therefore, the transparent film and the air, which differ from each other in a refractive index, can coexist on a boundary between the spacer layer 120 having the projections and an adjacent layer.

Meanwhile, the diffusion layer 130 is formed on the reflective layer 110 and is able to play a role in diffusing an incident light.

In this case, the diffusion layer 130 can be formed of one of polyethylene (PE), polyethylene terephthalate (PET), polypropylene (PP), polyvinylchloride (PVC), ethylene vinyl alcohol (EVA), urethane resin, polycarbonate (PC), polymethylmethacrylate (PMMA), etc. or a mixture thereof. And, the diffusion layer 130 can further include at least one of a scattering particle for scattering an incident light and a coloring agent for absorbing the incident light in part.

Moreover, a multitude of projections can be further formed on a surface of the diffusion layer 130 on which a light is externally incident.

In this case, a height of each of the projections is preferably set to 70 µm~0.5 mm. A gap between the projections can be preferably set to 0.001~0.1 mm.

Figure 2:
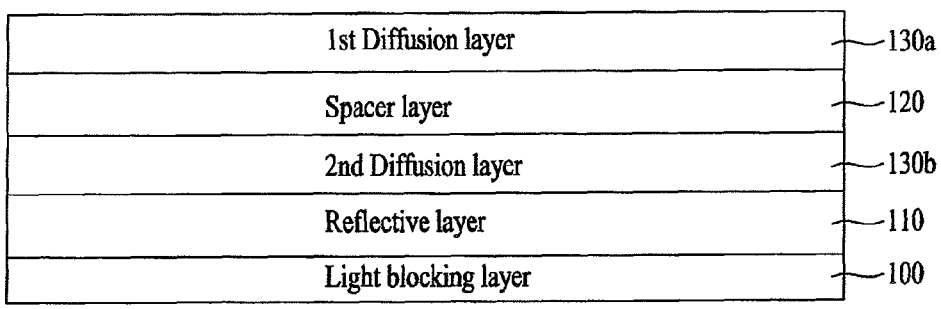
FIG. 2 is a cross-sectional diagram of a reflective type screen according to a second embodiment of the present invention.

FIG. 2 is a cross-sectional diagram of a reflective type screen according to a second embodiment of the present invention.

Referring to FIG. 2, a reflective type screen according to a second embodiment of the present invention includes a light block layer 100, a reflective layer 110 on the light blocking layer 100, a second diffusion layer 130b on the reflective layer 110, a spacer layer 120 on the second diffusion layer 130b and a first diffusion layer 130a on the spacer layer 120.

In this case, the spacer layer 120 can be formed between the first diffusion layer 130a and the second diffusion layer 130b. In order to refract an incident light, a refractive index of the first diffusion layer 130a can be set different from that of the second diffusion layer 130b.

In particular, a refractive index difference between the spacer layer 120 and the first diffusion layer 130a or a refractive index difference between the spacer layer 120 and the second diffusion layer 130b is about 0.01~1. And, the refractive index of the spacer layer 120 can be set greater than that of the first/second diffusion layer 130a/130b.

And, the spacer layer 120 can be formed of air or a transparent film.

For instance, each of the first and second diffusion layers 130a and 130b is formed of the transparent film and the spacer layer 120 formed between the first and second diffusion layers 130a and 130b can be formed of air.

In this case, the spacer layer 120 formed of the air is formed 0.001 µm~1 mm thick. And, each of the first and second diffusion layers 130a and 130b can be formed of one of polyethylene (PE), polyethylene terephthalate (PET), polypropylene (PP), polyvinylchloride (PVC), ethylene vinyl alcohol (EVA), urethane resin, polycarbonate (PC), polymethylmethacrylate (PMMA), etc. or a mixture thereof.

Alternatively, the first diffusion layer 130a, the second diffusion layer 130b and the spacer layer 120 can include transparent films. And, they can be formed of one of polyethylene (PE), polyethylene terephthalate (PET), polypropylene (PP), polyvinylchloride (PVC), ethylene vinyl alcohol (EVA), urethane resin, polycarbonate (PC), polymethylmethacrylate (PMMA), etc. or a mixture thereof.

In case that the spacer layer 120 is formed of the transparent film, the spacer layer 120 is preferably formed of a material having a refractive index differing from that of each of the first and second diffusion layers 130a and 130b.

Since the second embodiment of the present invention differs from the first embodiment of the present invention only in that the diffusion layer is additionally included, its details are omitted from the following description.

FIG. 3 is a cross-sectional diagram of a reflective type screen according to a third embodiment of the present invention.

Referring to FIG. 3, a reflective type screen according to a third embodiment of the present invention includes a light blocking layer 100, a reflective layer 110 on the light blocking layer 100, a second spacer layer 120b on the reflective layer 110, a first spacer layer 120a on the second spacer layer 120a and a diffusion layer 130.

In this case, the first and second spacer layers 120a and 120b can be formed between the reflective layer 110 and the diffusion layer 130. And, each of the first and second spacer layers 120a and 120b can have a refractive index differing from that of each of the reflective layer 110 and the diffusion layer 130.

In particular, a refractive index difference between each of the first and second spacer layers 120a and 120b and the reflective layer 110 or a refractive index difference between each of the spacer layers 120a and 120b and the diffusion layer 130 is set to 0.01~1. And, the refractive index of each of the first and second spacer layers 120a and 120b can be greater than that of each of the reflective layer 110 and the diffusion layer 130.

The first spacer layer 120a and the second spacer layer 120b can differ from each other in a refractive index. Preferably, the refractive index of the firs spacer layer 120a is set greater than that of the second spacer layer 120b, by which the present invention is non-limited.

In this case, each of the first and second spacer layers 120a and 120b can be formed of air or a transparent film. Preferably, the first and second spacer layers 120a and 120b are formed of different materials, respectively, by which the present invention is non-limited.

For instance, if the first spacer layer 120a is formed of the air, the second spacer layer 120 can be formed of the transparent film.

In this case, the second spacer 120b formed of the transparent film is preferably formed 150 μm~1 mm thick. And, the first spacer layer 120a formed of the air can be formed 0.001 μm~1 mm thick.

For another instance, if the first spacer layer 120a is formed of the transparent film, the second spacer layer 120 can be formed of the air.

In this case, the first spacer 120a formed of the transparent film is preferably formed 150 μm~1 mm thick. And, the first spacer layer 120a formed of the air can be formed 0.001 μm~1 mm thick.

In this case, the refractive index difference between the first spacer layer 120a and the second spacer layer 120b can be set to 0.01~1.

In particular, the refractive index difference between the second spacer layer 120b and the reflective layer 110 or the refractive index difference between the second spacer layer 120b and the first spacer layer 120a is 0.01~1. The refractive index difference between the first spacer layer 120q and the second spacer layer 120b or the refractive index difference between the first spacer layer 120a and the diffusion layer 130 can be set to 0.01~1.

Since the third embodiment of the present invention differs from the first embodiment of the present invention only in that the spacer layer is additionally included, its details are omitted from the following description.

Occasionally, a plurality of spacer layers (at least two spacer layers) can be provided between the diffusion layer and the reflective layer.

FIG. 4 is a cross-sectional diagram of a reflective type screen according to a fourth embodiment of the present invention.

Referring to FIG. 4, a reflective type screen according to a fourth embodiment of the present invention includes a light blocking layer 100, a reflective layer 110 on the light blocking layer 100, a second diffusion layer 130b on the reflective layer 110, a second spacer layer 120b on the second diffusion layer 130b, a first spacer layer 120a on the second spacer layer 120b and a first diffusion layer 130a on the first spacer layer 120a.

In this case, the first and second spacer layers 120a and 120b can be formed between the first diffusion layer 130a and the second diffusion layer 130b. And, each of the first and second spacer layers 120a and 120b can have a refractive index differing from that of each of the first diffusion layer 130a and the second diffusion layer 130b.

In particular, a refractive index difference between each of the first and second spacer layers 120a and 120b and the first diffusion layer 130a or a refractive index difference between each of the spacer layers 120a and 120b and the second diffusion layer 130 is set to 0.01~1. And, the refractive index of each of the first and second spacer layers 120a and 120b can be greater than that of each of the first and second diffusion layers 130a and 130b.

The first spacer layer 120a and the second spacer layer 120b can differ from each other in a refractive index. Preferably, the refractive index of the first spacer layer 120a is set greater than that of the second spacer layer 120b, by which the present invention is non-limited.

In this case, each of the first and second spacer layers 120a and 120b can be formed of air or a transparent film. Preferably, the first and second spacer layers 120a and 120b are formed of different materials, respectively, by which the present invention is non-limited.

For instance, if the first spacer layer 120a is formed of the air, the second spacer layer 120 can be formed of the transparent film.

In this case, the second spacer layer 120b formed of the transparent film is preferably formed 150 μm~1 mm thick. And, the first spacer layer 120a formed of the air can be formed 0.001 μm~1 mm thick.

For another instance, if the first spacer layer 120a is formed of the transparent film, the second spacer layer 120 can be formed of the air.

In this case, the first spacer 120a formed of the transparent film is preferably formed 150 μm~1 mm thick. And, the second spacer layer 120b formed of the air can be formed 0.001 μm~1 mm thick.

In this case, the refractive index difference between the first spacer layer 120a and the second spacer layer 120b can be set to 0.01~1.

In particular, the refractive index difference between the second spacer layer 120b and the second diffusion layer 130b or the refractive index difference between the second spacer layer 120b and the first spacer layer 120a is 0.01~1. The refractive index difference between the first spacer layer 120q and the second spacer layer 120b or the refractive index difference between the first spacer layer 120a and the first diffusion layer 130a can be set to 0.01~1.

Since the fourth embodiment of the present invention differs from the first embodiment of the present invention only in that the spacer layer and the diffusion layer are additionally included, its details are omitted from the following description.

Occasionally, a plurality of spacer layers (at least two spacer layers) can be provided between the first and second diffusion layers.

FIG. 5 is a cross-sectional diagram of a reflective type screen according to a fifth embodiment of the present invention.

Referring to FIG. 5, a reflective type screen according to a fifth embodiment of the present invention includes a light blocking layer 100, a reflective layer on the light blocking layer 100, a second spacer layer 120b on the reflective layer 110, a second diffusion layer 130b on the second spacer layer 120b, a first spacer layer 120a on the second diffusion layer 130b, and a first diffusion layer 130a on the first spacer layer 120a.

In this case, the first spacer layer 120a is formed between the first diffusion layer 130 and the second diffusion layer 130b and can have a refractive index differing from that of each off the first and second diffusion layers 10a and 130b.

Moreover, the second spacer layer 120b is formed between the reflective layer 110 and the second diffusion layer 130b and can have a refractive index differing from that of each of the reflective layer 110 and the second diffusion layer 130b.

In particular, a refractive index difference between the first spacer layer 120a and the first diffusion layer 130a or a refractive index difference between the first spacer 120a and the second diffusion layer 130b is 0.01~1. And, a refractive index of the first spacer layer 120a can be greater than that of each of the first and second diffusion layers 130a and 130b.

In particular, a refractive index difference between the second spacer layer 120b and the reflective layer 110 or a refractive index difference between the second spacer 120b and the second diffusion layer 130b is 0.01~1. And, a refractive index of the second spacer layer 120b can be greater than that of each of the reflective layer 110 and the second diffusion layers 130b.

The first spacer layer 120a and the second spacer layer 120b can differ from each other in a refractive index. Preferably, the refractive index of the first spacer layer 120a is set greater than that of the second spacer layer 120b, by which the present invention is non-limited.

In this case, each of the first and second spacer layers 120a and 120b can be formed of air or a transparent film. Optionally, the first and second spacer layers 120a and 120b are formed of the same material or can be formed of different materials, respectively.

For instance, each of the first and second spacer layers 120a and 120b can be formed of either the air or the transparent film.

In this case, each of the first and second spacer layers 120b formed of the transparent film is preferably formed 150 μm~1 mm thick. And, each of the first and second spacer layers 120a and 120b formed of the air can be formed 0.001 μm~1 mm thick.

If both of the first and second spacer layers 120a and 120b are formed of the transparent films, respectively, an air layer can be further provided between the first spacer layer 120a and the second diffusion layer 130b.

In this case, the air layer is preferably formed 0.001 μm~1 mm thick.

Since the fifth embodiment of the present invention differs from the fourth embodiment of the present invention only in that a depositing sequence of the second spacer layer and the second diffusion layer is changed, its details are omitted from the following description.

Occasionally, a plurality of spacer layers (at least one spacer layer) can be formed between the first and second diffusion layers. Alternatively, a plurality of spacer layers (at least one spacer layer) can be formed between the second diffusion layer and the reflective layer.

Accordingly, a reflective type screen according to the present invention increases diffusion of light using at least one spacer layer, thereby enhancing brightness, image quality and viewing angle.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A reflective type screen, comprising:
    a light blocking layer configured to block an incident light;
    a reflective layer on the light blocking layer and configured to reflect the incident light;
    a diffusion layer on the reflective layer and configured to diffuse the incident light; and
    a spacer layer arranged between the reflective layer and the diffusion layer and configured to have a refractive index different from a refractive index of an adjacent layer,
    the spacer layer comprising a transparent film,
    wherein the transparent film comprises at least one of a scattering particle for scattering the incident light and a coloring agent for absorbing the incident light.

2. The reflective type screen of claim 1, wherein a refractive index difference between the spacer layer and the reflective layer or the diffusion layer is in a range of 0.01 to 1.

3. The reflective type screen of claim 1, wherein the refractive index of the at least one spacer layer is greater than the refractive index of the reflective layer or the diffusion layer.

4. The reflective type screen of claim 1, wherein the transparent film comprises:
    at least one material selected from the group comprising polyethylene (PE), polyethylene terephthalate (PET), polypropylene (PP), polyvinylchloride (PVC), ethylene vinyl alcohol (EVA), urethane resin, polycarbonate (PC) and polymethylmethacrylate (PMMA).

5. The reflective type screen of claim 1,
    wherein a diameter of the scattering particle is in a range of 1 to 200 μm.

6. The reflective type screen of claim 1, wherein the coloring agent comprises:
    one of black dye and black pigment.

7. The reflective type screen of claim 1,
    wherein the at least one spacer layer comprises the air layer, and
    wherein a thickness of the transparent film is in a range of 150 μm to 1 mm.

8. The reflective type screen of claim 1, further comprising:
    projections arranged on a surface of the transparent film.

9. The reflective type screen of claim 8, wherein a height of one of the plural projections is in a range of 70 μm to 0.5 mm.

10. The reflective type screen of claim 8, wherein a space between the plural projections is filled with air.

11. The reflective type screen of claim 8, wherein a size of a gap between the projections is in a range of 0.001 to 0.1 mm.

12. The reflective type screen of claim 1, wherein a weight percent of the scattering particle is in a range of 1 to 50 with respect to a weight of the transparent film.

13. The reflective type screen of claim 1, wherein a weight percent of the coloring agent is in a range of 1 to 10 with respect to a weight of the transparent film.

14. A reflective type screen, comprising:
    a light blocking layer configured to block an incident light;
    a reflective layer on the light blocking layer and configured to reflect the incident light;
    first and second diffusion layers on the reflective layer and configured to diffuse the incident light; and
    a layer arranged between the first and second diffusion layers and having a refractive index differing from a refractive index of each of the first and second diffusion layers, wherein the spacer layer comprises a first layer comprising an air layer and a second layer comprising a transparent film, and wherein the second layer comprises at least one of a scattering particle for scattering the incident light and a coloring agent for absorbing the incident light.

15. The reflective type screen of claim 14, wherein one of a refractive index difference between the at least one spacer layer and the first diffusion layer and a refractive index difference between the at least one spacer layer and the second diffusion layer is in a range of 0.01 to 1, and wherein the refractive index of the at least one spacer layer is greater than the refractive index of each of the first and second diffusion layers.

16. A reflective type screen, comprising:

a light blocking layer configured to block an incident light;

a reflective layer on the light blocking layer and configured to reflect the incident light;

a first film on the reflective layer, the first film comprising a first diffusion layer diffusing the incident light and a first spacer layer having a refractive index different from a refractive index of the first diffusion layer; and a second film on the first film, the second film comprising a second diffusion layer configured to diffuse the incident light and a second spacer layer having a refractive index different from a refractive index of the second diffusion layer, wherein one of the first spacer layer and the second spacer layer comprises at least one of a scattering particle for scattering the incident light and a coloring agent for absorbing the incident light.

17. The reflective type screen of claim 16, further comprising:

an air layer arranged between the first film and the second film.

18. The reflective type screen of claim 17, wherein a thickness of the air layer is in a range of 0.001 to 0.01 μm.

19. The reflective type screen of claim 16, wherein a diameter of the scattering particle is in a range of 1 to 200 μm.

* * * * *